United States Patent
Casey

[19]

[11] Patent Number: 5,876,127
[45] Date of Patent: Mar. 2, 1999

[54] MOUNTING ASSEMBLY INCLUDING A TAPERED MOUNTING ADAPTER SLEEVE

[75] Inventor: Marlon R. Casey, Indianapolis, Ind.

[73] Assignee: Rexnord Corporation, Milwaukee, Wis.

[21] Appl. No.: 962,916

[22] Filed: Oct. 27, 1997

Related U.S. Application Data

[63] Continuation of Ser. No. 539,323, Oct. 4, 1995, abandoned.

[51] Int. Cl.$^6$ .............. F16C 43/04; F16B 7/04
[52] U.S. Cl. ............... 384/538; 384/540; 384/584; 384/585; 403/370; 403/371
[58] Field of Search .................. 384/538, 540, 384/584, 585; 403/370, 371

[56] References Cited

U.S. PATENT DOCUMENTS

| | | | |
|---|---|---|---|
| 738,445 | 9/1903 | Hoffmann | 403/371 |
| 1,116,845 | 11/1914 | Rogers . | |
| 1,957,062 | 5/1934 | Graham et al. | 308/236 |
| 2,048,972 | 7/1936 | Scheffler | 403/371 |
| 2,118,891 | 5/1938 | Marino | 384/538 |
| 2,690,346 | 9/1954 | Miller | 384/538 |
| 2,980,474 | 4/1961 | Gargan | 308/236 |
| 3,395,956 | 8/1968 | Fisher | 308/236 |
| 3,709,575 | 1/1973 | Howe, Jr. | 384/538 |
| 3,807,820 | 4/1974 | Schuhmann | 384/538 |
| 3,816,013 | 6/1974 | Schuhmann | 384/538 |
| 3,912,412 | 10/1975 | Struttman | 384/538 |
| 3,918,779 | 11/1975 | Halliger et al. | 384/538 |
| 3,953,142 | 4/1976 | Price et al. | 403/371 |
| 3,957,385 | 5/1976 | Ullberg | 403/370 |
| 4,304,502 | 12/1981 | Stratienico | 403/371 |
| 4,596,477 | 6/1986 | Lundgren | 384/538 |
| 4,626,114 | 12/1986 | Phillips | 384/584 |
| 4,893,948 | 1/1990 | Hoch | 384/551 |
| 5,011,306 | 4/1991 | Martinie | 384/585 |
| 5,074,680 | 12/1991 | Hoch et al. | 384/584 |
| 5,153,990 | 10/1992 | Martinie | 29/898.07 |
| 5,211,488 | 5/1993 | Patz et al. | 384/584 |
| 5,333,380 | 8/1994 | Patz et al. | 29/898.07 |
| 5,489,156 | 2/1996 | Martinie | 384/538 |
| 5,529,403 | 6/1996 | Martinie | 384/585 |

FOREIGN PATENT DOCUMENTS

| | | | |
|---|---|---|---|
| 0723101 | 7/1942 | Germany | 384/585 |
| 3736979 | 5/1988 | Germany | 403/370 |
| 0192640 | 11/1937 | Switzerland | 384/585 |

*Primary Examiner*—Charles A. Marmor
*Assistant Examiner*—Matthew A. Kaness
*Attorney, Agent, or Firm*—Michael Best & Friedrich LLP

[57] ABSTRACT

A bearing assembly adapted to be mounted on a shaft, the assembly including a sleeve having a frustoconical outer surface and a bore adapted to be placed on the shaft; and an inner ring defining a second bore, the second bore having a first portion which is engageable with the outer surface of the sleeve and the second bore having a second portion adjacent the first portion and extending at an angle radially outwardly from the first portion.

20 Claims, 1 Drawing Sheet

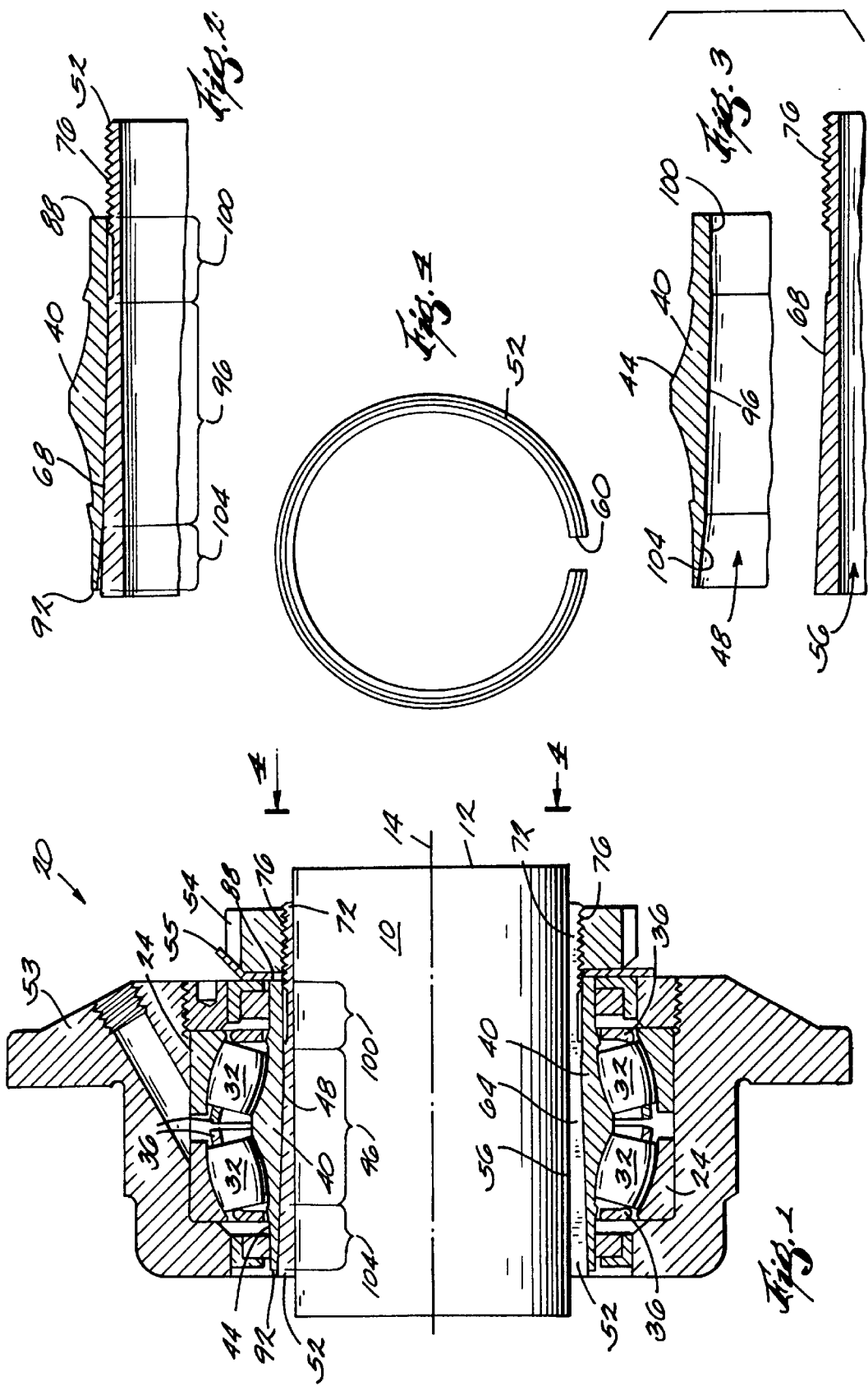

5,876,127

MOUNTING ASSEMBLY INCLUDING A TAPERED MOUNTING ADAPTER SLEEVE

This is a continuation of application Ser. No. 08/539,323, filed Oct. 4, 1995 entitled MOUNTING ASSEMBLY INCLUDING A TAPERED MOUNTING ADAPTER SLEEVE", now abandoned.

BACKGROUND OF THE INVENTION

1. Technical Field

The invention relates generally to apparatus for mounting a bearing assembly on a shaft and, more particularly, to such mounting apparatus including a tapered mounting adapter sleeve.

2. Related Prior Art

It is generally known to mount bearing assemblies on a shaft through the use of set screws or eccentric collars which lock the inner ring of the bearing assembly to the shaft. In such designs, the inner ring of the bearing assembly extends longitudinally along the shaft and is incorporated in the mechanisms for sealing the inner ring against the shaft and for locking the bearing assembly on the shaft.

It is also known to provide a bearing assembly with an inner ring which has extending therethrough a tapered bore and which loosely surrounds the shaft. Such bearing assembly designs also include a cylindrical wedge or tapered mounting adapter sleeve that is also placed over the shaft. The sleeve has therein a longitudinally extending slit which allows the sleeve to be placed over the shaft but affords compression or squeezing the sleeve into frictional engagement with the shaft. The sleeve is pulled into engagement with the tapered bore in the inner ring of the bearing assembly. The wedge-like engagement between the tapered sleeve and the tapered bore creates an interference fit between the sleeve and the inner ring, and compresses the sleeve into locked engagement with the shaft. The locked engagement between the inner ring and the sleeve, and between the sleeve and the shaft thereby fixes the inner ring relative to the shaft.

The use of a tapered sleeve in conjunction with a tapered inner ring to mount a bearing assembly on a shaft is advantageous in that this type of bearing assembly mounting accommodates shafts which may have a circumference differing from a nominal specified circumference. Known set screw-mounted or collar-mounted roller bearing assemblies are not as likely to be successfully used with undersized shafts because such arrangements result in premature failure of the bearing assembly mounting. Use of such traditional mounting apparatus on a shaft that is undersized by only several thousands of an inch can cause such problems.

However, the range of shaft sizes that can be accommodated through use of a tapered bearing assembly mounting is limited in part by the width of the slit in the tapered sleeve and the range of available relative longitudinal movement between the inner ring and the tapered sleeve. This range of longitudinal relative movement is determined in large part by the length and angles of the tapers on the inner ring and on the outer surface of the mounting adaptor sleeve. Also, the axial length of the inner ring and the axial length of the tapered sleeve in part determine the range of relative longitudinal movement therebetween.

Another factor limiting the range of shaft sizes that can be accommodated by a bearing assembly is the available space or envelope available in which the bearing assembly must fit when mounted upon the shaft. In general, a bearing assembly designed for large loads requires a larger envelope or pitch diameter than a lighter duty bearing assembly.

It is also known that the use of a tapered bearing assembly mounting is advantageous for applications requiring the use of shafts made of hardened material or for applications wherein the direction of shaft rotation is expected to reverse.

SUMMARY OF THE INVENTION

One of the problems associated with known bearing assembly designs which use a mounting adapter sleeve is that the inner ring can be prone to fracture due to stresses caused by drawing the inner sleeve into engagement with the tapered bore of the inner ring. This is particularly true in bearing assemblies having a relatively wide inner ring, i.e., an axial extent along the shaft. In such bearing assembly designs, one edge of the inner ring is thicker than the other edge of the inner ring because of the reduction in material along the width of the inner ring necessary to define a uniform taper along the length of the bore. The wider the inner ring, the greater the variation in inner ring thickness from one edge to the other.

One commonly used technique to alleviate such stress concentrations and to prevent such fracture of the inner ring is to utilize a bearing assembly having a larger or thicker inner ring, which often results in the use of a bearing assembly which is designed for heavier duty than required for the application in which the bearing assembly is to be used. A problem presented by this technique is that the envelope in which the bearing assembly must fit is too small for the pitch diameter of the heavier-duty bearing assembly. This problem can be particularly difficult in repairing or retrofitting applications wherein bearing assemblies have failed and the available bearing assembly envelope is constrained.

The invention provides a bearing assembly having an inner ring which provides a tapered inner bore and a tapered mounting adapter sleeve. The inner ring bore includes three portions which lie in various angles relative to the axis of the shaft upon which the bearing assembly is mounted. In one embodiment of the invention, a first portion of the bore is generally cylindrical and is sized to house a threaded portion of the sleeve. A second, intermediate portion of the bore is located within a relatively thick section of the inner ring and lies at an angle equal to the taper on the outer surface of the mounting adapter sleeve. This intermediate portion of the inner ring mates with the mounting adapter sleeve to fix the bearing assembly in position on the shaft.

The inner ring bore also includes a third portion which lies at an increased angle relative to the axis of the shaft, i.e., provides a relieve surface extending from the intermediate portion of the bore. This third portion is located within a relatively thin portion of the inner ring. The increase in the angle of the taper in this third portion of the inner ring bore provides stress relief should this portion of the inner ring engage the tapered sleeve, and preferably provides clearance between the tapered mounting adapter sleeve and the third portion of the inner ring bore.

One advantage of the invention is the provision of a bearing assembly that can be used on hardened shafts or applications wherein the direction of shaft rotation is expected to reverse.

Another advantage of the invention is the provision of a bearing assembly that can accommodate a range of shaft diameters. Another advantage of the invention is the provision of a bearing assembly that is mounted with a tapered sleeve but that is not prone to stress failures in the inner ring of the bearing assembly.

Another advantage of the invention is the provision of a bearing assembly which uses a tapered mounting adapter sleeve engaged with a relatively thick portion of the inner ring, and which does not require an increase in pitch diameter or envelope size of the bearing assembly. The invention therefore also provides a bearing assembly that is well-suited for the purposes of repair, replacement and retrofitting.

Other features and advantages of the invention will become apparent to those skilled in the art upon review of the following detailed description, claims and drawings.

DESCRIPTION OF THE DRAWINGS

FIG. 1 is a cross-sectional view of a bearing assembly which embodies the invention and which is mounted on a shaft.

FIG. 2 is an enlarged view of a portion of the bearing assembly shown in FIG. 1.

FIG. 3 is an exploded view similar to FIG. 2.

FIG. 4 is a view taken generally along line 4—4 in FIG. 1.

DETAILED DESCRIPTION OF THE PREFERRED EMBODIMENT

FIG. 1 illustrates a shaft 10 including an end 12 and extending along an axis 14. The shaft 10 supports a bearing assembly 20 adjacent the end 12.

The bearing assembly 20 includes an outer ring 24, a plurality of ball bearings or rollers 32 engaged with the outer ring 24, and a plurality of retainers 36 for holding the rollers 32 in position. The bearing assembly 20 also includes a generally annular inner ring 40 which provides an outer surface 44 engaged with the rollers 32 and which has extending therethrough a tapered bore 48 surrounding the shaft 10. A mounting adapter sleeve 52 also surrounds the shaft 10 and is located between the shaft 10 and the inner ring 40. A housing 53 surrounds the inner ring 40, retainers 36, rollers 32, and outer ring 24.

The bearing assembly 20 also includes a lock nut 54 which, in a manner discussed below, is threadedly engaged with the sleeve 52 and which is used to draw the sleeve 52 into wedged engagement with the inner ring 40. A locking washer 55 rotationally fixes the lock nut 54.

More particularly, and with reference to FIGS. 1 and 4, the mounting adapter sleeve 52 extends along the axis 14 of the shaft 10 and has extending therethrough a uniformly cylindrical bore 56 which engages the outer surface of the shaft 10. The sleeve 52 has therein a longitudinally extending slit 60 which extends the entire length of the sleeve 52. The sleeve 52 is sized to slide over the shaft 12 when the sleeve 52 is undeformed, and the provision of the slit 60 along the sleeve 52 affords compression of the sleeve 52 into locked frictional engagement with the shaft 10 in a manner discussed below. The sleeve 52 also has a first portion 64 which provides a tapered outer surface 68. The first portion 64 extends from one end of the sleeve 52 to a point intermediate the opposite ends of the sleeve 52. The first portion 64 is somewhat frustoconical with a relatively small diameter at the middle of the sleeve 52 and an increasing diameter from the middle of the sleeve 52 to the one end. The taper angle for the first portion 64 of the sleeve 52 is uniform. While various angles of taper can be used successfully, one suitable included taper angle is approximately 3° 34'. The drawings exaggerate the taper in the outer surface 68 for the purpose of illustration.

The sleeve 52 also includes a second portion 72 which provides external threads 76 adjacent the end of the sleeve 52 opposite the tapered first portion 64.

The inner ring 40 of the bearing assembly 20 is configured to mate with the sleeve 52 so that the bearing assembly 20 can be fixed to the shaft 10. More particularly, and with reference to FIG. 2, the inner ring 40 has an outboard edge 88 located adjacent the end 12 of the shaft 10 and an inboard edge 92. The bore 48 of the inner ring 40 extends between the inboard and the outboard edges 92, 88.

The thickness of the inner ring 40 varies from the outboard edge 88 to the inboard edge 92. The inner ring 40 is relatively thick at the outboard edge 88, and increases in thickness toward the middle of the inner ring 40 where the radially outer surface 44 engages the rollers 32. In general, however, and particularly along the portion of the inner ring 40 adjacent the inboard edge 92, the inner ring thickness decreases and is relatively thin. Because the inboard extent of the inner ring 40 is thinner than the outboard extent, i.e., the cross-sectional area of the inner ring 40 in a plane perpendicular to the axis 14 is greater adjacent the outboard edge 88 and middle of the inner ring 40 than at the inboard edge 92, stresses of equal magnitude placed on the outboard and inboard portions of the inner ring 42 would be concentrated adjacent the inboard edge 92 relative to the middle and outboard portions. In order to alleviate or, ideally, to avoid such stress concentrations, the bore 48 has several portions which lie at different angles relative to the axis 14 and to the tapered portion 68 of the sleeve 52, including a relief angle adjacent the inboard edge 92.

More particularly, the bore 48 through the inner ring 40 includes an intermediate portion 96 located between the inboard and outboard edges 92, 88. The intermediate portion 96 of the bore 48 is located generally under the thicker portion of the inner ring 40 supporting the rollers 32. The intermediate portion 96 of the bore 48 lies at an angle relative to the axis 14 which approximates the angle of the tapered surface 68 of the sleeve 52 i.e., an included bore taper of approximately 3° 34'. The drawings exaggerate this angle for the purpose of illustration. When the sleeve 52 is drawn into the bore 48 of the inner ring 40, the outer surface 68 of the sleeve 52 slides along and engages the intermediate portion 96 of the inner ring bore 48.

The bore 48 in the inner ring 40 also includes an outboard portion 100 which extends between the intermediate portion 96 and the outboard edge 88. The outboard portion 100 of the bore 48 is generally smooth and cylindrical, and extends generally parallel to the axis 14. The diameter of the outboard portion 100 of the bore 48 is somewhat larger than the outer diameter of the external threading 76 on the sleeve 52 and can be moved into housing relation to the threading 76. This housed relationship of the threads 76 by the inner ring 40 affords a greater degree of relative movement between the inner ring 40 and the sleeve 52 is the direction of the axis 14, thereby affording use of the bearing assembly 20 with a greater range of sizes of shafts than if there were interference between the threads 76 and the outboard portion 100 of the bore 48. For example, depending upon the size of the shaft, tapered sleeve, etc . . . , increases in the range of undersized shafts that can be accommodated can be on the order of 50%, e.g., the range of acceptable shaft diameter deviation from nominal can increase from −0.003" to −0.006".

In an alternative construction not shown in the drawings, the increase in available longitudinal displacement of the sleeve 52 relative to the inner ring 40 can be provided by a smooth bore-portion on the lock nut 54 which, like the outboard portion 100 of the bore 48, can be moved into housing relation to the threads 76. In such a construction, the lock nut 54 would still engage the outboard edge 88 of the inner ring 40, and would engage the threads 76 to the extent necessary to draw the sleeve 52 into engagement with the shaft 10.

The bore 48 in the inner ring 40 also includes an inboard portion 104 extending between the intermediate portion 96 of the bore 48 and the inboard edge 92. The inboard portion 104 of the bore 48 is also tapered and lies at an angle relative to the axis 14 greater than the angle between the intermediate portion 96 and the axis 14 and greater than the angle of taper on the sleeve 52, so that the inboard portion 104 extends at an angle radially outwardly from the intermediate portion 96.

For example, an included taper angle of approximately 4°–4° 30" would be a suitable relief angle for the inboard portion 104. The inboard portion 104 therefore splays open adjacent the inboard edge 92 of the inner ring 40 and preferably provides clearance between the outer surface 68 of the sleeve 52 and the inner ring inboard portion 104. In the event the sleeve 52 contacts the inboard portion 104 of the bore 48, the relief angle provided by the inboard portion 104 of the bore 48 reduces the concentration of stresses in the thinner, inboard portion of the inner ring 40 and, therefore, reduces the likelihood of fractures propagating through the thinner portion of the inner ring 40 due to engagement of the inner ring 40 with the sleeve 52.

The bearing assembly 20 can be mounted on the shaft 10 as follows: the sleeve 52 is first placed on the shaft 10 with the threaded end 72 of the sleeve 52 being nearer the end 12 of the shaft 10. Then the inner ring 40, along with the rollers 32 and outer ring 24 are placed on the shaft 10. Because the sleeve 52 is in an undeflected state, the sleeve 52 is slidably engaged with the shaft 10, and the sleeve 52 can be moved into housed relation with bore 48 of the inner ring 40. When so housed, the threaded end 72 of the sleeve 52 extends past the outboard edge 88 of the inner ring 40. The lock nut 54 can then be threaded on to the sleeve 52 until the lock nut 54 engages the outboard edge 88 of the inner ring 40. The lock nut 54 can then be turned to further draw the sleeve 52 toward the end 12 of the shaft 10 and into engagement with the inner ring 40. Particularly, the outer surface 68 of the sleeve 52 moves into engagement with the intermediate portion 96 of the inner ring bore 48 and slides longitudinally along the shaft 10 and the intermediate portion 96. As the tapered outer surface 68 of the sleeve 52 and the tapered intermediate surface 96 of the bore 48 become wedged together, the sleeve 52 compresses and the slit 60 narrows until the sleeve 52 is frictionally locked with the shaft 10 or until the a sufficient amount of torque is applied to the lock nut 54.

During this process of drawing the sleeve 52 into wedged engagement with the intermediate portion 96 of the inner ring 40, the inboard portion 104 of the inner ring 40 ideally remains clear of the outer surface 68 of the sleeve 52 and is free of strain being placing thereon. In the event the sleeve 52 does contact the inboard portion 104 of the inner ring bore 48, the relief angle at which the extends relative to the intermediate portion 96 of the bore 48 reduces the amount of stress that might otherwise be concentrated in the inner ring 40 adjacent the inboard edge 92.

It should also be clear to those of ordinary skill in the art that other arrangements of the sleeve and the inboard portion of the inner ring are included with the scope of the invention. For example, the sleeve could be formed so as to provide a relief angle so that the inboard portion of the inner ring bore is not engaged by the sleeve.

Other features and advantages of the invention are set forth in the following claims.

I claim:

1. A bearing assembly adapted to be mounted on a shaft defining an axis, said assembly comprising:

an outer ring;

a plurality of rollers engaged with the outer ring;

a cylindrical sleeve having a frustoconical outer surface and a being adapted to be placed on the shaft; and an inner ring having an outer surface engaging the rollers and defining a bore having a first tapered portion which is engageable with the outer surface of the sleeve and which extends radially away from the axis at a first taper angle and the bore having a second tapered portion located adjacent the first portion and extending radially away from the axis and radially outwardly from the first tapered portion at a second taper angle, wherein the first taper angle is an acute angle that is greater than 0°, and wherein the second taper angle is an acute angle that is greater than the first taper angle.

2. A bearing assembly as set forth in claim 1 wherein the sleeve includes a threaded end, and wherein the bore defined by the inner ring includes a cylindrical portion which is located adjacent the first tapered portion and which affords housing relation of the inner ring and the threaded end of the sleeve.

3. A bearing assembly as set forth in claim 1 wherein the inner ring has an outboard edge having a thickness, and wherein the inner ring has an inboard edge having a thickness less than that of the outboard edge.

4. A bearing assembly as set forth in claim 1 wherein the sleeve has a threaded end which is received by the inner ring, and further including a lock nut which can be threaded onto the threaded end of the sleeve.

5. A bearing assembly as set forth in claim 1 wherein the sleeve has a threaded end which is received by the inner ring, and further including a lock nut which engages the inner ring and the threaded end of the sleeve.

6. A bearing assembly as set forth in claim 5 wherein the nut has a bore having a threaded portion engageable with the sleeve and a smooth portion which can house the threaded end of the sleeve.

7. The bearing assembly of claim 1 wherein the second taper angle provides clearance between the outer surface of the sleeve and the second tapered portion of the inner ring when the first tapered portion of the inner ring is engaged with the outer surface of the sleeve.

8. The bearing assembly of claim 1 wherein rollers are ball bearings.

9. A bearing assembly adapted to be mounted on a shaft defining an axis, said assembly comprising:

an outer ring, a plurality of rollers engaged with the outer ring, a sleeve adapted to be placed on the shaft, the sleeve having a generally frustoconical outer surface extending radially away from the axis at a first taper angle, wherein the first taper angle is an acute angle that is greater than 0°, the sleeve also having a threaded end, and an inner ring having an outer surface engaging the rollers and having extending therethrough a bore including a first tapered portion that is engageable with the tapered outer surface of the sleeve, the first tapered portion of the bore and the sleeve being engageable to compress the sleeve into frictional engagement with the shaft, the bore including a second tapered portion adjacent the first tapered portion, the second tapered portion extending away from the axis at a second taper angle, wherein the second taper angle is an acute angle that is greater than the first taper angle, the bore also including a generally cylindrical portion adjacent the first tapered portion, the generally cylindrical portion having a diameter sufficiently large to telescopically receive the threaded end of the sleeve, whereby the arrangement of the cylindrical portion of the inner ring and the threaded end of the sleeve affords a portion of the threaded end of the sleeve to be housed by the cylindrical portion of the inner ring when the sleeve is frictionally engaged with the shaft.

10. A bearing assembly as set forth in claim 9 wherein the first tapered portion of the bore in the inner ring extends away from the axis at the first taper angle.

11. A bearing assembly as set forth in claim 9 wherein the second tapered portion of the bore in the inner ring extends radially outwardly away from the first taper angle.

12. A bearing assembly as set forth in claim 9 wherein the inner ring has an outboard edge having a thickness, and wherein the inner ring has an inboard edge having a thickness less than that of the outboard edge.

13. The bearing assembly of claim 9 wherein the second taper angle provides clearance between the outer surface of the sleeve and the second tapered portion of the inner ring when the first tapered portion of the inner ring is engaged with the outer surface of the sleeve.

14. A bearing assembly adapted to be mounted on a shaft defining an axis, said assembly comprising:

an outer ring;

a plurality of rollers engaged with the outer ring;

a sleeve having a uniformly tapered, frustoconical outer surface extending radially from the axis at a first taper angle, a threaded end and being adapted to be placed in telescopic relation to the shaft, and an inner ring having an outer surface engaging the rollers and having extending therethrough an inner ring bore adapted to be placed on the sleeve, the inner ring bore having a first tapered portion extending radially away from the axis at the first taper angle and being engageable with the outer surface of the sleeve, the first tapered portion of the bore and the outer surface of the sleeve being complementary formed so as to be engageable to compress the sleeve into frictional engagement with the shaft, the inner ring bore also having a generally cylindrical portion, the generally cylindrical portion having a diameter sufficiently large to telescopically receive the threaded end of the sleeve, the arrangement of the cylindrical portion of the inner ring and the threaded end of the sleeve affording a portion of the threaded end to be housed by the cylindrical portion of the inner ring when the shaft is frictionally engaged with the shaft, and the inner ring bore having a second tapered portion adjacent the first tapered portion and extending radially away from the axis at a second taper angle that is greater than the first taper angle.

15. A bearing assembly as set forth in claim 14 wherein the inner ring bore includes the second tapered portion which extends radially away from the outer surface of the sleeve when the inner ring and the sleeve are engaged.

16. A bearing assembly as set forth in claim 14 wherein the second tapered portion of the inner ring bore extends along the axis and radially away from the axis and the first tapered portion of the inner ring bore.

17. A bearing assembly adapted to be mounted on a shaft defining an axis, said assembly comprising:

an outer ring:

a plurality of rollers engaged with the outer ring;

a sleeve adapted to be placed on the shaft, the sleeve having a threaded end, a lock nut engageable with the threaded end of the sleeve, and an inner ring having an outer surface engaging the rollers, an inner surface, an inboard edge, an outboard edge, the inner ring having a thickness defined by the outer surface and the inner surface, the thickness of the inner ring being greatest intermediate the inboard edge and the outboard edge, the inner surface of the inner ring defining a bore which extends through the inner ring and which receives and engages the sleeve, the bore having a first tapered portion extending along and radially away from the axis at a first taper angle which is an acute angle that is greater than 0°, and the bore having a second tapered portion adjacent the first tapered portion and extending along and radially away from the axis at a second taper angle which is an acute angle that is greater than the first taper angle, one of the lock nut and the inner ring including a generally cylindrical bore portion centered on the axis and having a diameter sufficiently large to telescopically receive the threaded end of the sleeve.

18. A bearing assembly as set forth in claim 17 wherein the inner ring provides the cylindrical bore portion.

19. A bearing assembly as set forth in claim 17 wherein the lock nut provides the cylindrical bore portion.

20. A bearing assembly as set forth in claim 17 and further comprising a plurality of rollers, an outer ring engaged with the rollers, and wherein the outer surface of the inner ring engages the rollers.

* * * * *